April 22, 1924.

J. KINDERVATER

AUTOMATIC STOP VALVE

Filed Nov. 21, 1923

1,491,241

WITNESSES:
S. H. Harrington
S. R. Bell.

INVENTOR
J. Kindervater,
by J. Snowden Bell.
atty.

Patented Apr. 22, 1924.

1,491,241

UNITED STATES PATENT OFFICE.

JULIUS KINDERVATER, OF NEW YORK, N. Y.

AUTOMATIC STOP VALVE.

Application filed November 21, 1921. Serial No. 516,668.

*To all whom it may concern:*

Be it known that I, JULIUS KINDERVATER, of the city, county, and State of New York, have invented a certain new and useful Automatic Stop Valve, of which improvement the following is a specification.

The object of my invention is to provide simple and effective means, whereby the flow of fuel oil, through a delivery pipe line, will be automatically cut off in the event of a sudden and abnormal reduction of outlet pressure, such, for example, as would be occasioned by a fracture of any part of the supply line to a burner, excessive leakage, or unduly wide opening of a burner valve, permitting the outflow of an unnecessary quantity of oil therefrom.

The improvement claimed is hereinafter fully set forth.

Figure 1:
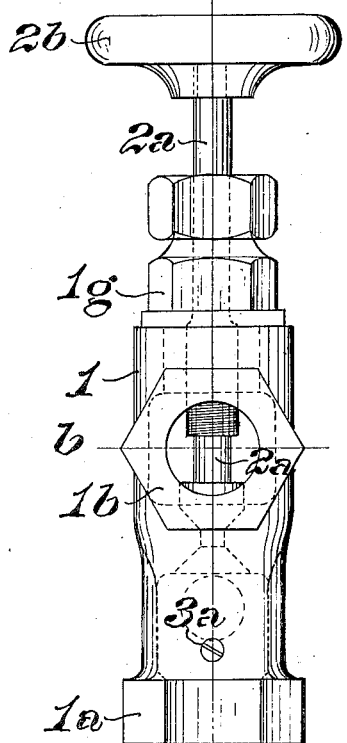
Figure 2:
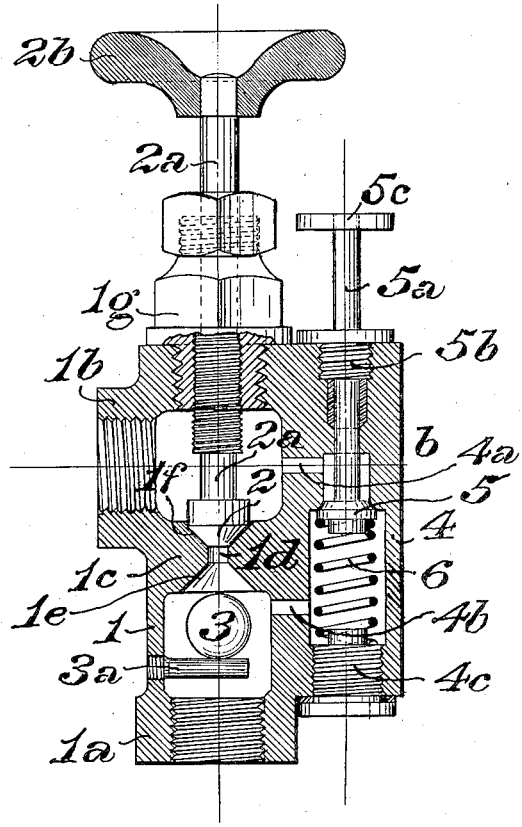
Figure 3:
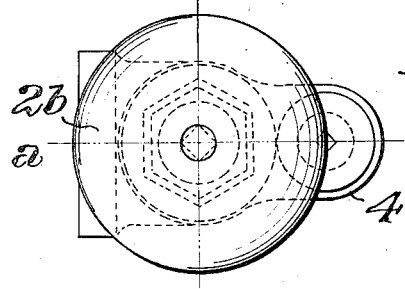
Figure 4:
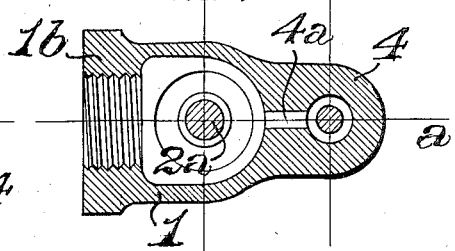

In the accompanying drawings: Figure 1 is a view, in elevation, of an automatic stop valve, illustrating an embodiment of my invention; Fig. 2, a longitudinal section through the same, on the line $a\ a$ of Figs. 3 and 4; Fig. 3, a plan or top view; and, Fig. 4, a transverse section, on the line $b\ b$ of Figs. 1 and 2.

In the practice of my invention, referring descriptively to the specific embodiment thereof which is herein exemplified, I provide a valve chest or case, 1, having an inlet nozzle, $1^a$, for the connection of an oil supply pipe, on one of its ends, and a lateral outlet nozzle, $1^b$, for the connection of an oil delivery pipe. A transverse wall or partition, $1^c$, is interposed between the inlet and outlet nozzles, said wall being perforated by a central oil passage, $1^d$, at the ends of which nearer the inlet and outlet nozzles, respectively, there are formed valve seats, $1^e$ and $1^f$.

A regulating valve, 2, which in the instance shown, is of the lift or poppet type, is fixed on a stem, $2^a$, and is fitted to be closed on the valve seat, $1^f$. The valve stem, $2^a$, is externally threaded, to engage a corresponding, internal thread on a nut, $1^g$, which is screwed into, and closes, the end of the valve chest nearer the valve seat, $1^f$. A hand wheel, $2^b$, is fixed on the outer end of the valve stem, $2^a$, to enable it to be rotated.

A ball valve, 3, the diameter of which will be dependent on the gravity of the oil which passes through the pipe line, is normally seated on a support, $3^a$, fixed in the wall of the valve chest, 1. An equalizing chamber, 4, is formed on one side of the valve chest, said chamber communicating with the interior thereof, by ports, $4^a$ and $4^b$, located, respectively, above and below the partition, $1^c$, of the chest. Communication between the ports, $4^a$ and $4^b$, is controlled by an equalizing valve, 5, fixed on a stem, $5^a$, projecting outwardly through a bonnet, $5^b$, in the equalizing chamber, and having a head, $5^c$, on its outer end. The valve, 5, is normally held seated, in the direction of the flow of oil through the pipe line, by an equalizing spring, 6. Said spring is supported on a plug, $4^c$, screwed into the bottom of the equalizing chamber.

In practical service, the appliance above described is fitted in the oil pipe line between the source of supply and the ordinary operating globe valve. Upon opening the latter, the ball valve, 3, will rise and seat on the valve face, $1^c$, thereby shutting off the supply of oil to the burner. The equalizing valve is then unseated by downward pressure of the operator's hand on the head, $5^c$, of its stem, allowing oil to by-pass through the ports, $4^b$ and $4^a$, and is held open until the space in the operating globe valve becomes filled with oil. The pressure above and below the ball valve, 3, then becomes equalized, and said valve drops to its seat on the support, $3^a$, allowing free flow of oil through the passage, $1^d$. The supply is regulated by the valve, 2, so as to provide only a sufficient feed of oil for the proper operation of the burner, and if, for any reason, as a sudden reduction of outlet pressure, resultant upon a fracture of the pipe line leading to the burner, excessive leakage, or the unduly great opening of the operating globe valve, an inordinate outflow of oil is occasioned, the ball valve will be automatically seated, cutting off the supply of oil, and will remain seated, until released by the manual operation of the equalizing valve, as before described.

It will be obvious that an appliance embodying my invention is of simple and inexpensive construction and ready applicability in an oil pipe line, and that, in its operation, waste of oil will be prevented, with corresponding exemption from liability to explosions and fires resultant from continued unintentional flow of oil from the line.

I claim as my invention and desire to secure by Letters Patent:

1. In an automatic stop valve, the combination of the casing having a passage for the normal flow of the fluid, a ported partition traversing said passage, a regulating valve to close said port against the flow, a check valve to close said port with the flow, an equalizing chamber in said casing communicating with said passage on opposite sides of said partition, a spring-pressed valve normally shutting off flow through said chamber, and manually operable means to open said spring-pressed valve when desired.

2. In an automatic stop valve, the combination with the casing having an inlet and an outlet for the fluid and a ported partition between said inlet and outlet, a manually operable regulating valve to close said port on one side of said partition, a ball check valve to close said port on the other side of said partition when the rate of flow exceeds a certain limit, a by-pass passage in said casing, ports leading therefrom to the spaces on each side of said partition, a valve adapted to close said passage, a spring tending to hold said valve seated, and a manually operable rod to open said valve when desired.

JULIUS KINDERVATER.

Witnesses:
J. SNOWDEN BELL,
GEORGE E. BROWN.